Aug. 13, 1968     L. E. FOSTER ET AL     3,396,753
PIPE REPAIR DEVICE
Filed Feb. 1, 1965     2 Sheets-Sheet 1

INVENTORS:
LAWRENCE E. FOSTER
HAROLD E. HICKS
BY Gravely, Lider & Woodruff
ATTORNEYS.

Aug. 13, 1968   L. E. FOSTER ET AL   3,396,753
PIPE REPAIR DEVICE
Filed Feb. 1, 1965   2 Sheets-Sheet 2

INVENTORS:
LAWRENCE E. FOSTER
HAROLD E. HICKS
BY Gravely, Lieder & Woodruff
ATTORNEYS.

— # United States Patent Office 3,396,753
Patented Aug. 13, 1968

3,396,753
PIPE REPAIR DEVICE
Lawrence E. Foster, Webster Groves, and Harold E. Hicks, Kirkwood, Mo., assignors to Nooter Corporation, St. Louis, Mo., a corporation of Missouri
Filed Feb. 1, 1965, Ser. No. 429,479
3 Claims. (Cl. 138—99)

ABSTRACT OF THE DISCLOSURE

A pipe repair clamp formed of two halves of a circular lightweight steel shell of "U" cross section with an external packing adjacent to the outer walls of the shell and the pipe held in place without penetrating the packing by clamps over the outer edge of the shell. Engaging flanges are welded onto the ends of the shell and have a round gasket therebetween. The gasket is positioned in an open ended groove terminating at the packing and rods movable from outside the clamps engage the ends of the gasket to force the gasket into sealing engagement with the packing.

---

This invention relates to pipe repair structures and particularly relates to a split ring pipe repair device having continuous packing members between a pipe section and the edges of the split sleeve members and between the said packing members at the abutting ends of the sleeve members.

The principal object of the present invention is to provide a split sleeve pipe repair structure having means for maintaining a positive seal between the abutting ends of the sleeve sections and the packing means between the lateral edges of the sleeve members and the pipe.

Another object of the present invention is to provide a seal between abutting flanges of a split sleeve pipe repair device utilizing movable pins positioned in the sleeves and adapted to urge the ends of the flange seal into sealing relationship with annular packing members positioned between the lateral edges of the sleeve members and the pipe section enclosed by the repair device.

Another object of the present invention is to provide a light wight pipe repair structure of steel which can be handled by on site workmen without using heavy equipment.

Still another object is to provide a split sleeve pipe repair structure of light weight which is simply fabricated and is non-leaking after installation.

Other objects and advantages will become apparent hereinafter.

In all pipe repair structures presently available there is an area of sealing weakness at the point where the flange seal between the abutting ends of the pipe repair sections meet the annular packing members between the lateral edges of the sleeve sections and the pipe outer surface. The present invention overcomes this problem by providing means for maintaining a positive pressure on the ends of the flange seal so as to urge the seal into sealing engagement with the packing members.

Also, present pipe repair devices are usually of heavy cast iron and require heavy equipment to install in the field. The present invention uses a light weight rolled steel "U" shaped channel formed into a circular shape and split, with flanges welded on the split ends to hold the split channel sections on the pipe. This structure can be assembled easily in the field by workmen without using heavy equipment and is easy to pack and ship.

The present invention comprises a split sleeve pipe repair structure for enclosing a section of pipe including means positively urging the ends of the flange seal into sealing engagement with packing positioned between the lateral edges of the sleeve and the enclosed pipe section.

The present invention further comprises the method and structure hereinafter described and claimed.

In the drawings, wherein like numbers refer to like parts wherever they occur:

Figure 1:
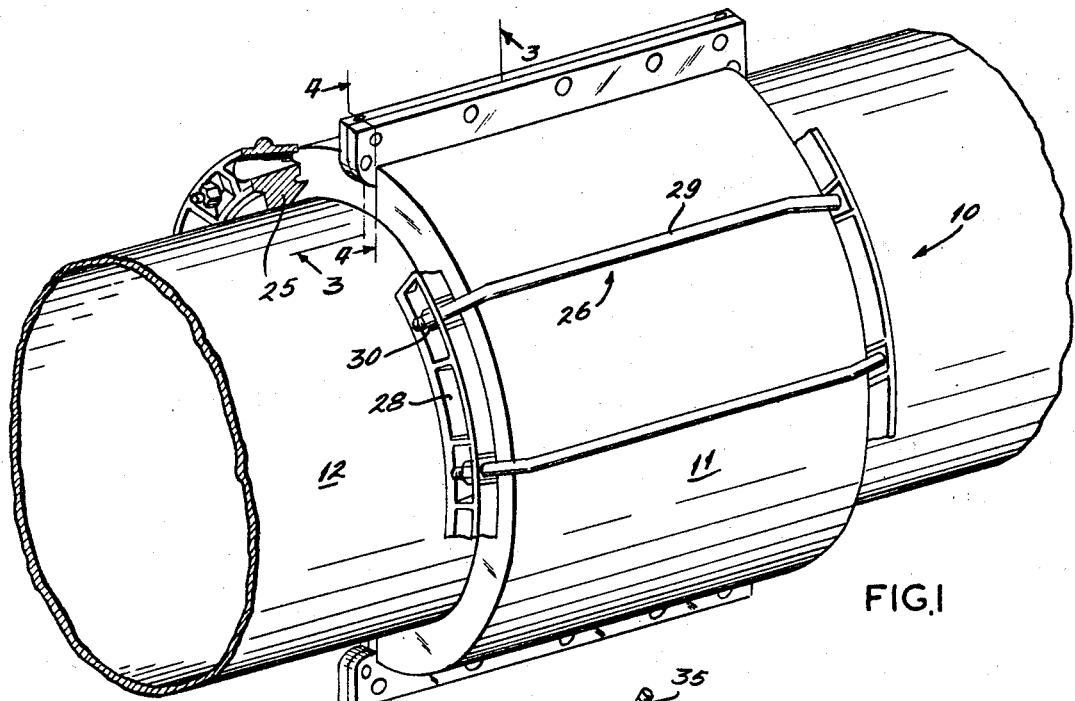
FIG. 1 is a fragmentary partially broken perspective view of a pipe repair structure positioned on a pipe section.
Figure 2:
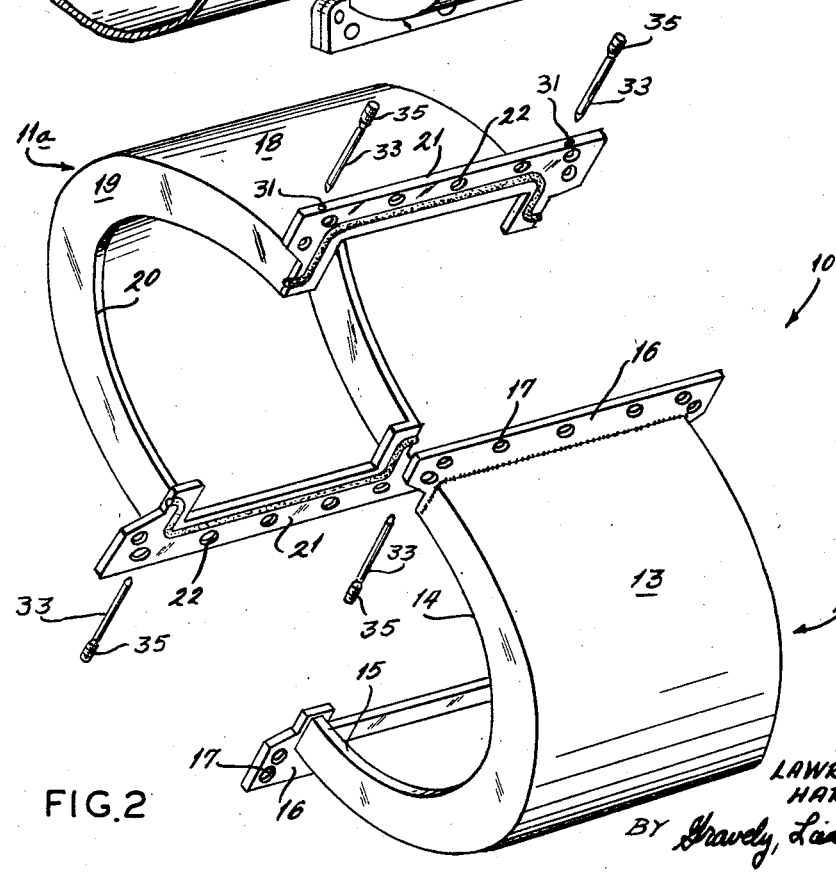
FIG. 2 is a perspective exploded view of the present pipe repair device.
Figure 3:
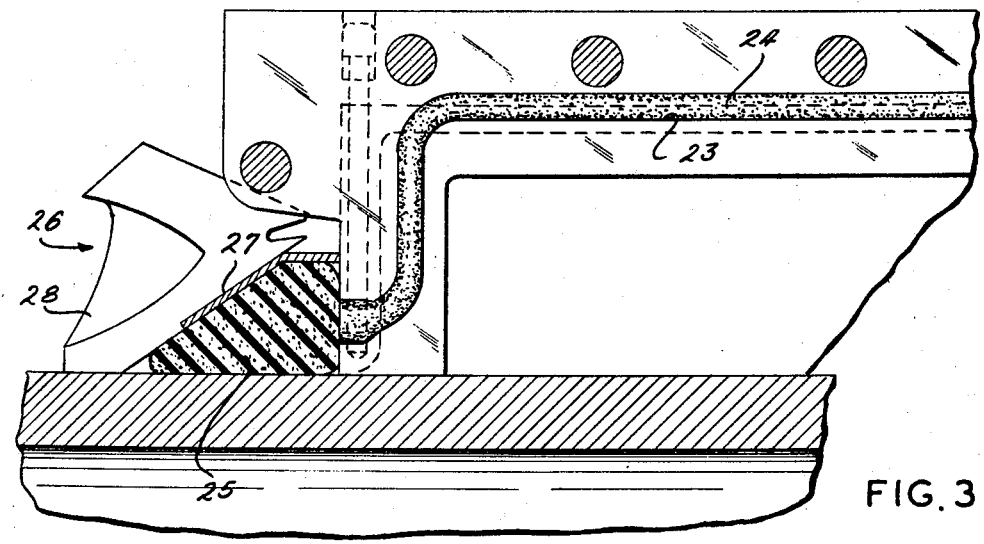
FIG. 3 is an enlarged fragmentary sectional view taken along line 3—3 of FIG. 1.
Figure 4:
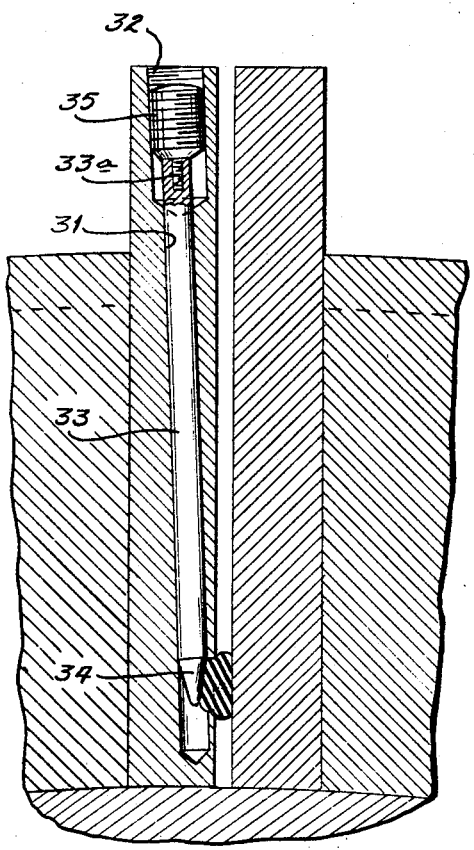
FIG. 4 is an enlarged fragmentary sectional view taken along line 4—4 of FIG. 1.

The present invention comprises a split sleeve pipe repair structure 10 comprising a righthand sleeve 11 and a lefthand sleeve 11a (FIG. 2) which are adapted to be positioned around a pipe section 12 (FIG. 1) so as to enclose the portion of the pipe section 12 which is in need of repair.

The sleeve sections 11 and 11a are formed from a commercial structural steel channel of U shape which is rolled to a circular shape, and split in half to form the sections 11 and 11a. Thereafter, the flanges 16 and 21 (hereinafter described in detail) are welded to the split ends of the sections 11 and 11a. For about a 2½ ft. diameter pipe, this structure weighs about 150 lbs. per half, whereas conventional cast iron sleeves weigh about 430 lbs. per half. Therefore, two men can easily handle the present device, whereas a cast iron repair structure requires heavy machinery to install or a substantially increased work crew.

The righthand section 11 includes an arcuate outer shell 13 having inwardly extending lateral edges 14 terminating in inner surfaces 15 which engage the outer surface of the pipe section 12. End closure flanges 16 are positioned on the ends of the righthand section 11 and are provided with securing bolt holes 17.

The lefthand sleeve section 11a comprises an arcuate outer shell 18 having inwardly directed edges 19 terminating in pipe engaging inner surfaces 20. The ends of the lefthand sleeve section 11a terminate in flange members 21 adapted to abut the righthand section flange members 16. The lefthand flange members 21 are provided with cooperating bolt holes 22, so that the sleeve sections 11 and 11a can be secured together around the pipe section 12.

Each of the lefthand section flanges 21 is provided with a continuous groove 23 which terminates in that area of the flange 21 which is a continuation of the side edge 19. The grooves 23 are adapted to hold round cross section gasket members 24 (which preferably are of Buna "N" rubber) which seal the flanges 21 and 16 so as to prevent the fluid in the pipe 12 escaping between the flange members 21 and 16.

Packing members 25 are positioned around the juncture of the sleeve section inner surfaces 15 and 20 and the outer surface of the pipe section 12 and are positively retained in position by a suitable clamp retaining means 26. The packing 25 is of a suitable soft gasket rubber and is supported by a metal cover 27 against which the retaining means 26 bears.

The retaining means 26 includes opposed clamp members 28 which engage the Monel seal rings 27 to urge the gasket 25 against the sleeve edges 19 and 14 and the pipe surface 12. Draw up studs 29 retain the clamps 28 and the nuts 30 are tightened to apply the packing 25 to pipe 12 and the sleeves 11 and 11a.

The particular improvement of the present invention comprises openings 31 formed in the left hand flanges 21 adjacent to the edges and positioned so as to intersect the grooves 23 and be accessible from outside the sleeve 11a. There are four such openings 31, each positioned so as to intersect the grooves 23 adjacent to their ends. Each of the openings 31 is provided with a threaded counterbore 32 on the upper end, and is adapted to receive a pin 33 having a tapered point 34 which engages the seal 24. The upper ends of the pin 33 are provided with threaded sockets 33a to receive a puller key (not shown) for removal and insertion of the pin 33. A threaded socket head set screw 35 retains the pin 33 in the opening 31 and can be rotated from outside the sleeve 11a to move the pin 33 farther into the opening 31 so as to increase the sealing pressure on the seal 24.

The pin heads 34 are adapted to engage the seals 24 and to positively urge the ends of the seal 24 into sealing engagement with the packing 25 so as to prevent leakage of fluid past the point at which the seals 24 engage the packing 25. Furthermore, if there is some leakage at this point, the pressure can be increased by moving the pin 33 downwardly through the opening 34 without having to disassemble the entire pipe repair structure 10.

It has been found that the pin 33 needs to be prepositioned so that the point 34 is at least partially within the groove 23 before the flange sections 16 and 21 are secured together and the seal 24 is drawn up, so as to prevent the gasket 24 from being extruded into the pin opening 31.

This invention is intended to cover all changes and modifications of the examples of the invention herein chosen for purposes of the disclosure, which do not constitute departures from the spirit and scope of the invention.

What is claimed is:
1. A split sleeve pipe repair structure for enclosing a section of a pipe line comprising arcuate segments which comprise halves of a circular steel channel member of substantially "U" shape having abutting flanges welded to the ends of the segments, said structure being of substantially light weight as compared to conventional cast iron pipe repair devices, the inner edges of the free ends of the "U" engaging the enclosed pipe, one of the abutting flange members being provided with a continuous groove thereacross, seal means positioned in the groove, means holding the abutting flange members together to compress the seal therebetween, edge packing members positioned against the outer side edges of the segments and against the adjacent pipe surfaces, a rigid backing for the edge packing extending around an outer inclined surface on the packing, wedging means extending across the outer surface of the channel member and engaging the edge packing backing members urging the edge packing members into sealing engagement with the outer side edges of the segments and the adjacent pipe surfaces without penetration of the packing members, the flange seals extending completely between the edge packing members, and means for urging the ends of the flange seals into continuous positive sealing engagement with the edge packing members.

2. The structure of claim 1 wherein one of the flange members is provided with an opening intersecting the flange groove, and including a pin positioned in the opening and in contact with the seal in the groove to exert pressure thereon to urge the seal into positive engagement with the packing members.

3. The structure of claim 2 wherein the pin is provided with a tapered end engaging the seal and means on the other end for removal from the opening, and wherein the flange opening is threaded at its open end and including screw means movable through the threaded portion of the flange opening and engaging the pin end to move the pin farther into the opening to increase the pressure on the seal from outside the repair structure.

References Cited
UNITED STATES PATENTS

| | | | |
|---|---|---|---|
| 1,242,380 | 10/1917 | Skinner | 138—99 X |
| 2,342,926 | 2/1944 | De Zarate et al. | 277—126 |
| 2,708,307 | 5/1955 | Newell et al. | 138—99 X |
| 2,708,951 | 5/1955 | Risley | 138—99 |
| 2,899,984 | 8/1959 | Gaffin | 138—99 |

LAVERNE D. GEIGER, *Primary Examiner.*

B. KILE, *Assistant Examiner.*